United States Patent
Fister et al.

[11] Patent Number: 5,916,695
[45] Date of Patent: *Jun. 29, 1999

[54] TIN COATED ELECTRICAL CONNECTOR

[75] Inventors: Julius C. Fister, Hamden; Szuchain Chen, Orange, both of Conn.; Abid A. Khan, Godfrey, Ill.; Dale L. Bender, Hoboken, N.J.

[73] Assignee: Olin Corporation, New Haven, Conn.

[ * ] Notice: This patent is subject to a terminal disclaimer.

[21] Appl. No.: 08/769,912

[22] Filed: Dec. 9, 1996

Related U.S. Application Data

[63] Continuation-in-part of application No. 08/657,211, Jun. 3, 1996, Pat. No. 5,780,172, which is a continuation-in-part of application No. 08/573,686, Dec. 18, 1995, abandoned.

[51] Int. Cl.$^6$ .............................. B32B 5/00; B32B 15/20; H01R 13/03
[52] U.S. Cl. ...................... 428/647; 428/646; 428/648; 428/675; 428/929; 428/935; 439/886
[58] Field of Search .................................. 439/886, 887; 428/646, 615, 655, 668, 669, 671, 674, 675, 676, 678, 680, 647, 648, 935, 929, 612; 427/372.2

[56] References Cited

U.S. PATENT DOCUMENTS

| | | | |
|---|---|---|---|
| 1,750,092 | 3/1930 | Crawford et al. | 205/256 |
| 3,247,082 | 4/1966 | Du Rose | 204/41 |
| 3,635,702 | 1/1972 | Badia et al. | 75/159 |
| 3,833,481 | 9/1974 | Olson et al. | 204/3 |
| 3,892,637 | 7/1975 | Polti | 204/37 T |
| 3,954,420 | 5/1976 | Hyner et al. | 29/183.5 |
| 4,131,517 | 12/1978 | Mitsuo et al. | 204/27 |
| 4,167,459 | 9/1979 | Lee et al. | 204/44 |
| 4,190,474 | 2/1980 | Berdan et al. | 156/151 |
| 4,311,768 | 1/1982 | Berdan et al. | 428/626 |
| 4,339,644 | 7/1982 | Aldinger et al. | 200/266 |
| 4,374,311 | 2/1983 | Okahashi et al. | 200/269 |
| 4,394,419 | 7/1983 | Konicek | 428/416 |
| 4,411,961 | 10/1983 | Tremmel | 428/613 |
| 4,441,118 | 4/1984 | Fister et al. | 357/70 |
| 4,498,121 | 2/1985 | Breedis et al. | 361/401 |
| 4,525,434 | 6/1985 | Morikawa et al. | 428/674 |
| 4,549,043 | 10/1985 | Kalubowila et al. | 174/133 R |
| 4,707,724 | 11/1987 | Suzuki et al. | 357/71 |
| 4,736,236 | 4/1988 | Butt | 357/70 |
| 4,882,236 | 11/1989 | Smith et al. | 428/652 |
| 5,001,546 | 3/1991 | Butt | 357/71 |
| 5,019,222 | 5/1991 | Hino et al. | 204/27 |
| 5,021,300 | 6/1991 | Stacey | 428/620 |
| 5,028,492 | 7/1991 | Guenin | 428/614 |
| 5,114,543 | 5/1992 | Kajiwara et al. | 205/152 |
| 5,268,235 | 12/1993 | Lashmore et al. | 428/610 |
| 5,320,719 | 6/1994 | Lashmore et al. | 205/104 |
| 5,320,919 | 6/1994 | Azuma et al. | 428/546 |

FOREIGN PATENT DOCUMENTS 2-285091  11/1990  Japan.

OTHER PUBLICATIONS

"Barrier Layers Against Diffusion" by P.J. Kay and C.A. Mackay. Appearing in Transactions of the Instutitute of Metal Finishing, (1979) vol. 57, at pp. 169–174.

"Electroplated Palladium Coating As a Nickel Migration (Thermal) Barrier" by J.K. Lim, J.S. Russo and E. Antonier, appearing in Plating & Surface Finishing, at pp. 64–67, (Mar. 1996).

*Primary Examiner*—John J. Zimmerman
*Attorney, Agent, or Firm*—Gregory S. Rosenblatt; Wiggin & Dana

[57] ABSTRACT

An electrical conductor has a copper base substrate coated with a tin base coating layer. To inhibit the diffusion of copper from the substrate into the coating layer and the consequential formation of a brittle tin/copper intermetallic, a barrier layer is interposed between the substrate and the coating layer. This barrier layer contains from 20% to 40%, by weight, of nickel and is preferably predominantly comprised of copper. In one embodiment, an intermetallic layer selected from the group $(Cu-Ni)_3Sn$, $(Cu-Ni)_6Sn_5$, $Cu_3Sn$, $Cu_6Sn_5$ is disposed between the barrier layer and the tin base coating layer.

8 Claims, 7 Drawing Sheets

TIN COATED ELECTRICAL CONNECTOR

CROSS-REFERENCE TO RELATED APPLICATION

This patent application is a continuation in part of U.S. patent application Ser. No. 08/657,211, filed on Jun. 3, 1996, entitled "Tin Coated Electrical Connector" that is now U.S. Pat. No. 5,780,172 and is, in turn, a continuation in part of U.S. patent application Ser. No. 08/573,686 (now abandoned) that was filed on Dec. 18, 1995. Both patent application Ser. No. 08/573,686 and U.S. Pat. No. 5,742,172 are incorporated by reference in their entirety herein.

BACKGROUND OF THE INVENTION

1. Field of the Invention

This invention relates to tin coated copper based electrical connectors having a reduced rate of copper/tin intermetallic formation. More particularly, a barrier layer containing from 20% to 40%, by weight, of nickel is disposed between the connector substrate and the coating. Alternatively, the barrier layer contains a copper/tin intermetallic compound.

2. Background of the Invention

Electrical connectors, such as sockets and plugs, are typically formed from a copper base alloy substrate that provides good electrical conductivity. When the electrical connector will be exposed to elevated temperature during operation, such as under the hood of an automobile, the substrate is formed from a copper base alloy having high strength and a resistance to stress relaxation.

The resistance to stress relaxation is recorded as a percent of stress remaining after a strip sample is preloaded to a set percent of the yield strength, typically 80%, in a cantilever mode per ASTM (American Society for Testing and Materials) specifications. The strip is then heated, typically to 125° C., for a specified number of hours, typically up to 3000 hours, and retested periodically. The higher the stress remaining at each retest, the better the utility of the specified composition for spring applications.

To reduce elevated temperature tarnish of the copper base substrate and to enhance solderability, a coating layer is frequently applied to the substrate. Typical coating layers include nickel, palladium/nickel alloys, tin and tin alloys. To minimize cost, tin is frequently used.

At elevated temperatures, copper diffuses from the substrate and combines with the tin to form intermetallics such as $Cu_6Sn_5$ and $Cu_3Sn$. The formation of the intermetallics reduces the amount of unreacted or free tin on the surface. This will degrade the electrical, corrosion and other performance characteristics.

It is known to interpose a barrier layer between the copper base substrate and the tin base coating layer to reduce the formation of the copper/tin intermetallic. A publication by Kay et al. appearing in the *Transactions of the Institute of Metal Finishing*, Volume 59, 1979, at page 169, discloses that barrier layers such as nickel, cobalt and iron, as well as alloys such as tin/nickel, copper/tin and nickel/iron, are disposed between a copper base substrate and a tin coating to reduce the formation of intermetallics.

While effective, these barriers do not provide the inhibition to intermetallic formation required for under the hood automotive applications that require a minimum amount of free tin remain after exposure to 125° C. for 3000 hours.

SUMMARY OF THE INVENTION

Accordingly, it is an object of the invention to interpose a barrier layer between a copper base substrate and a tin base coating that reduces the rate of copper/tin intermetallic formation.

It is a feature of the invention that in one embodiment, this barrier layer is an alloy that has, by weight, from 20% to 40% nickel. The nickel may be combined with copper, iron or tin. Yet another feature of the invention is that the thickness of this barrier layer is between 0.2 micron and 10% of the total thickness of a component.

In one alternative embodiment of the invention, the barrier layer is formed by plating alternating layers of different metals and then diffusing the layers to form a desired alloy.

In a second alternate embodiment of the invention, the barrier layer is pre-saturated with the nickel/tin intermetallic.

Among the advantages of the barrier layer of the invention is that a sufficient thickness of free tin remains on the surface of the component after elevated temperature exposure to retain the integrity of the coating layer.

In accordance with the invention, there is provided a composite material having a copper or a copper base alloy substrate. A tin or tin base alloy coats a portion of this substrate. A barrier layer is interposed between the substrate and the tin or tin base alloy. The barrier layer contains from 20% to 40%, by weight, of nickel and has a thickness of from 0.2 microns to 5 microns.

The above stated objects, features and advantages will become more apparent from the specification and drawings that follow.

IN THE DRAWINGS

FIG. 1 illustrates in cross-sectional representation an electrical connector in accordance with the invention.

FIG. 2 graphically illustrates the relationship between the nickel content and the rate of intermetallic formation for a system having a binary copper/nickel barrier layer.

Figure 5:
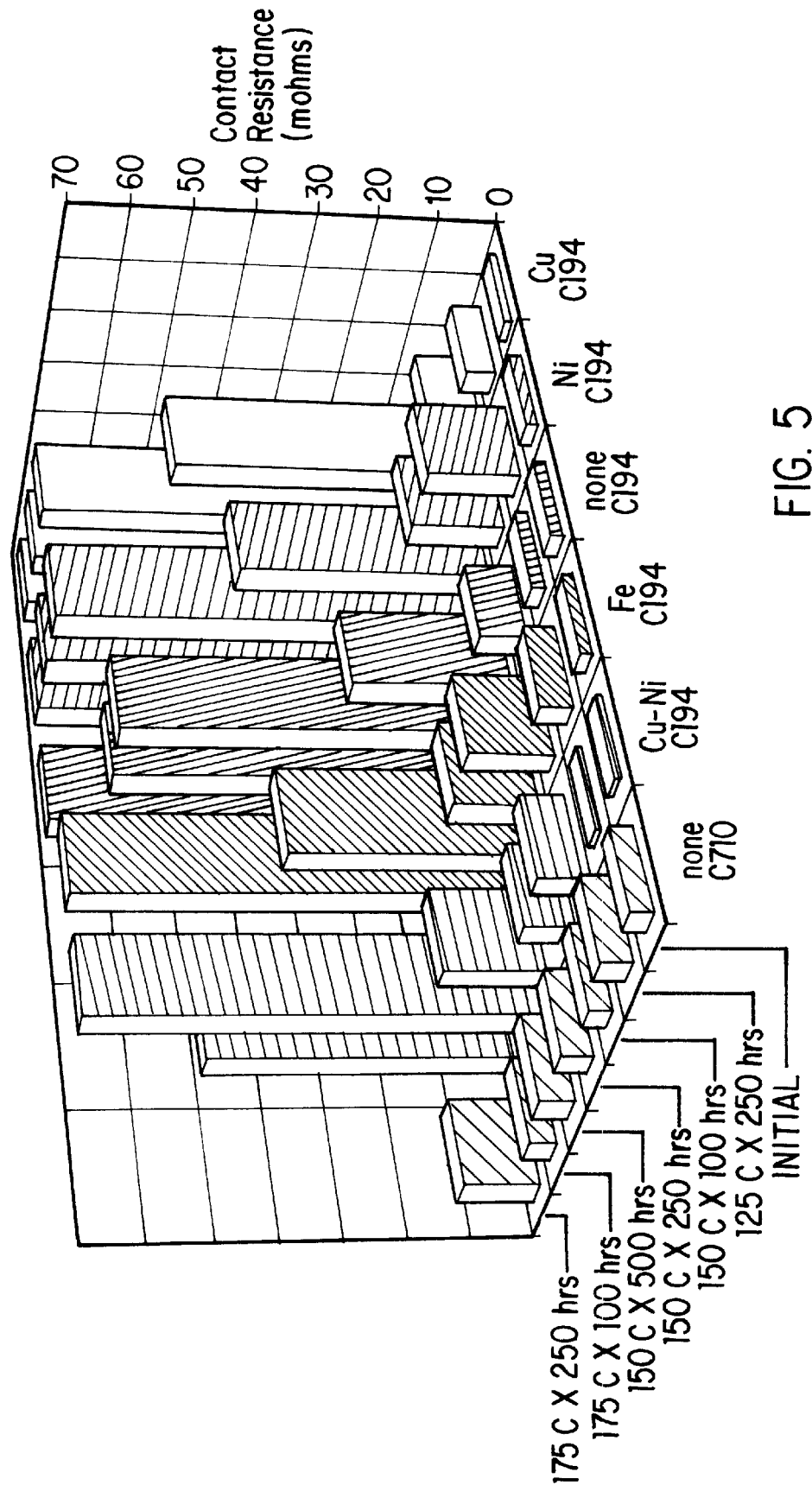

FIG. 5 graphically illustrates the contact resistance as a function of the aging time and the aging temperature.

Figure 6:
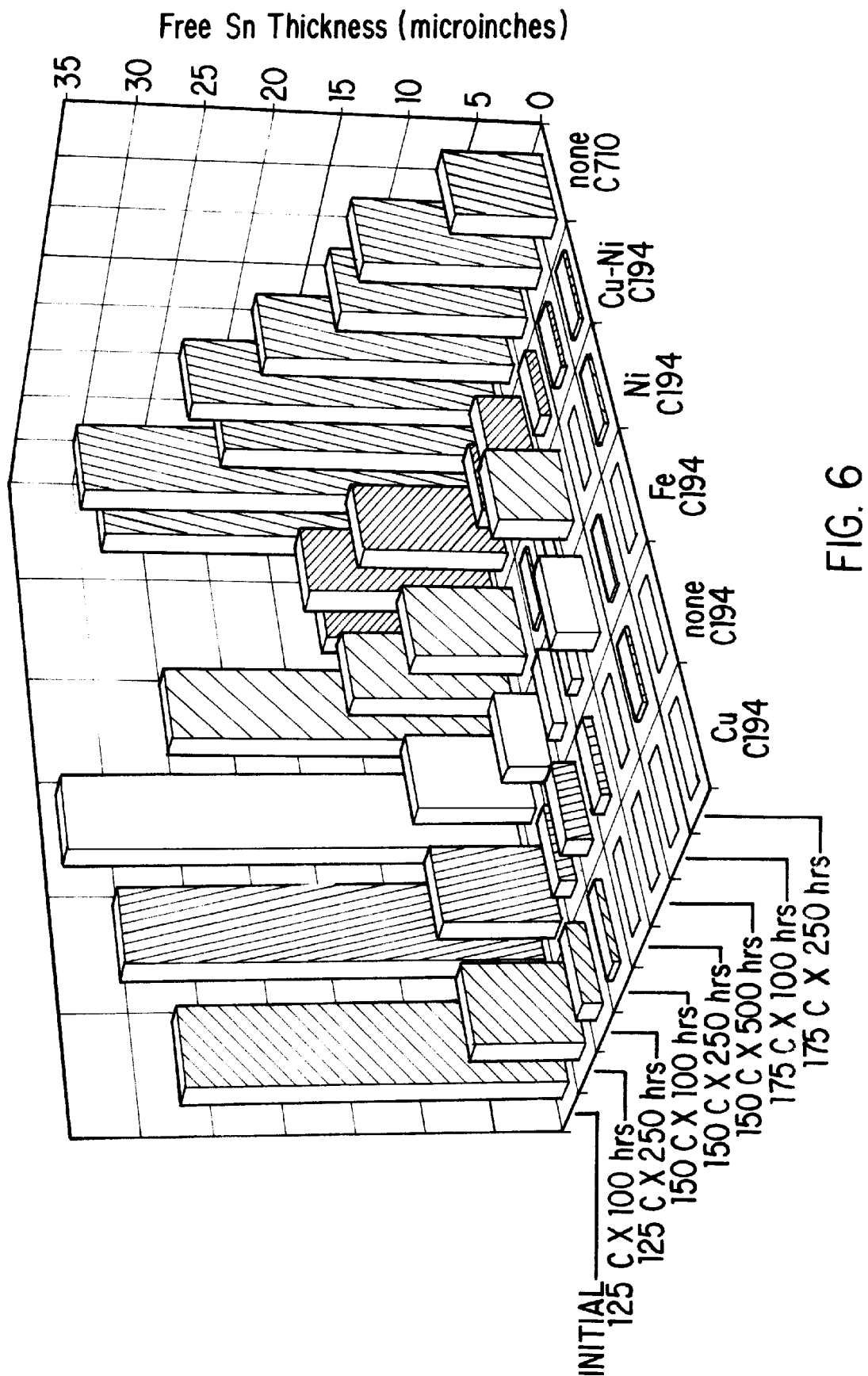

FIG. 6 graphically illustrates the free tin thickness as a function of the aging time and the aging temperature.

Figure 7:
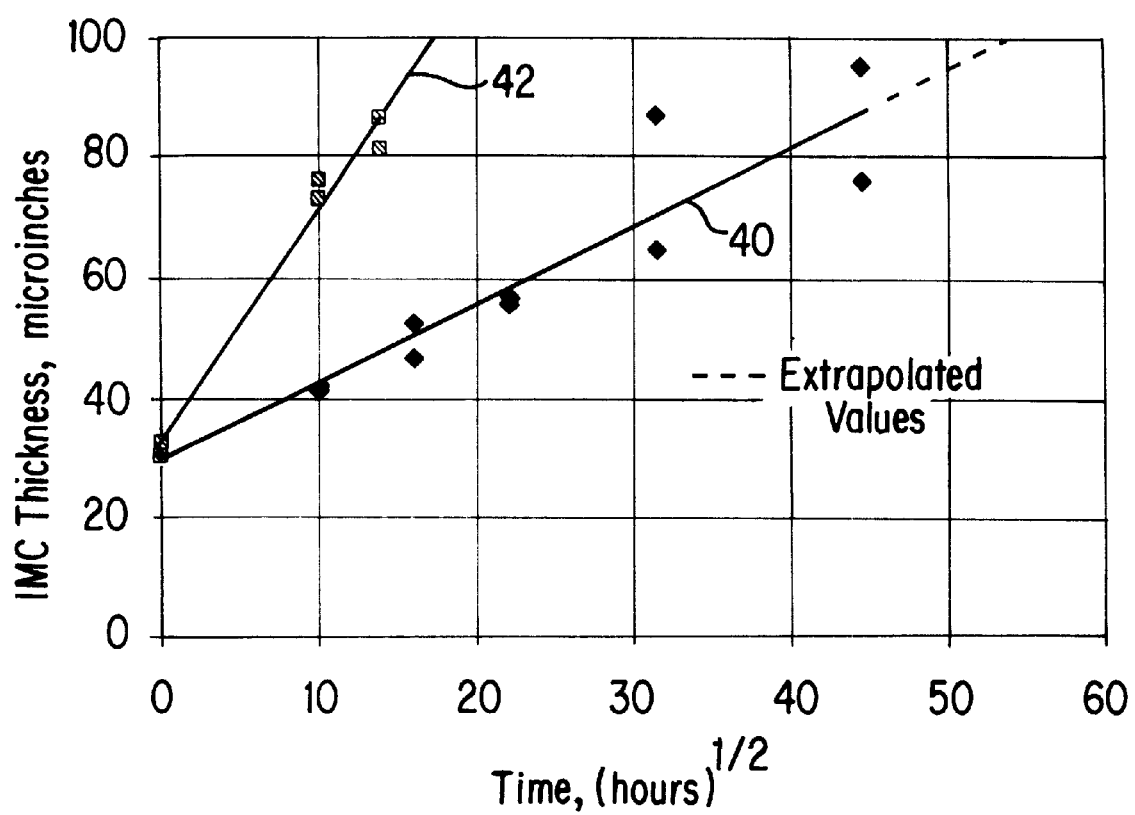

FIG. 7 graphically illustrates the effect of the barrier layer on the intermetallic thickness as a function of hours of aging.

Figure 8:
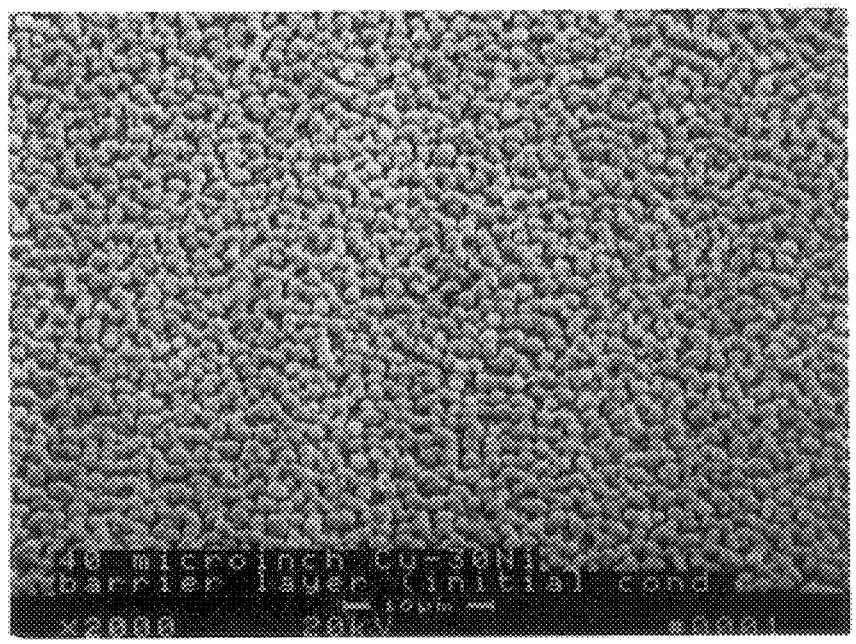

FIG. 8 is a photomicrograph of a copper/tin intermetallic formed on a non-wrought substrate.

Figure 9:
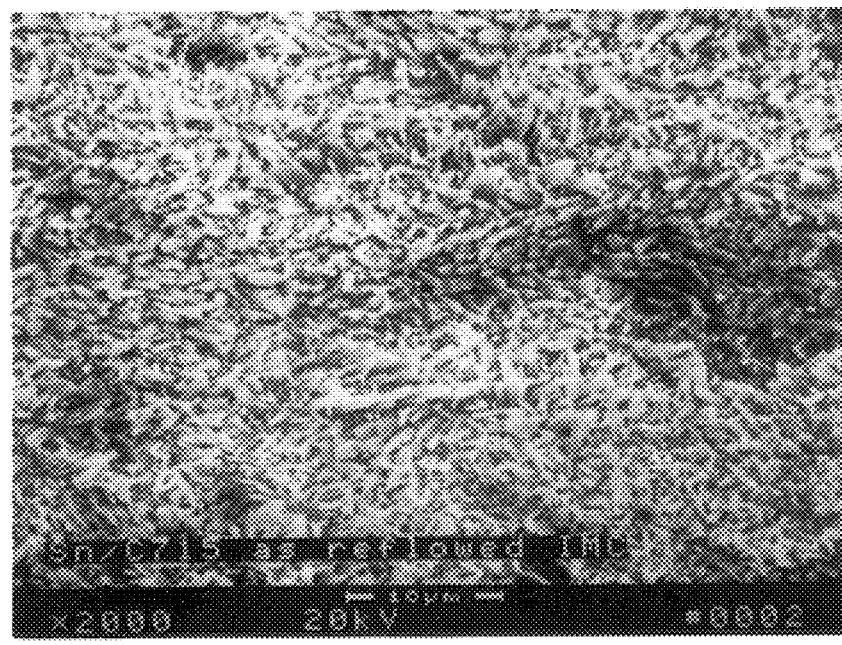

FIG. 9 is a photomicrograph of a copper/tin intermetallic formed on a wrought substrate.

DETAILED DESCRIPTION

Figure 1:
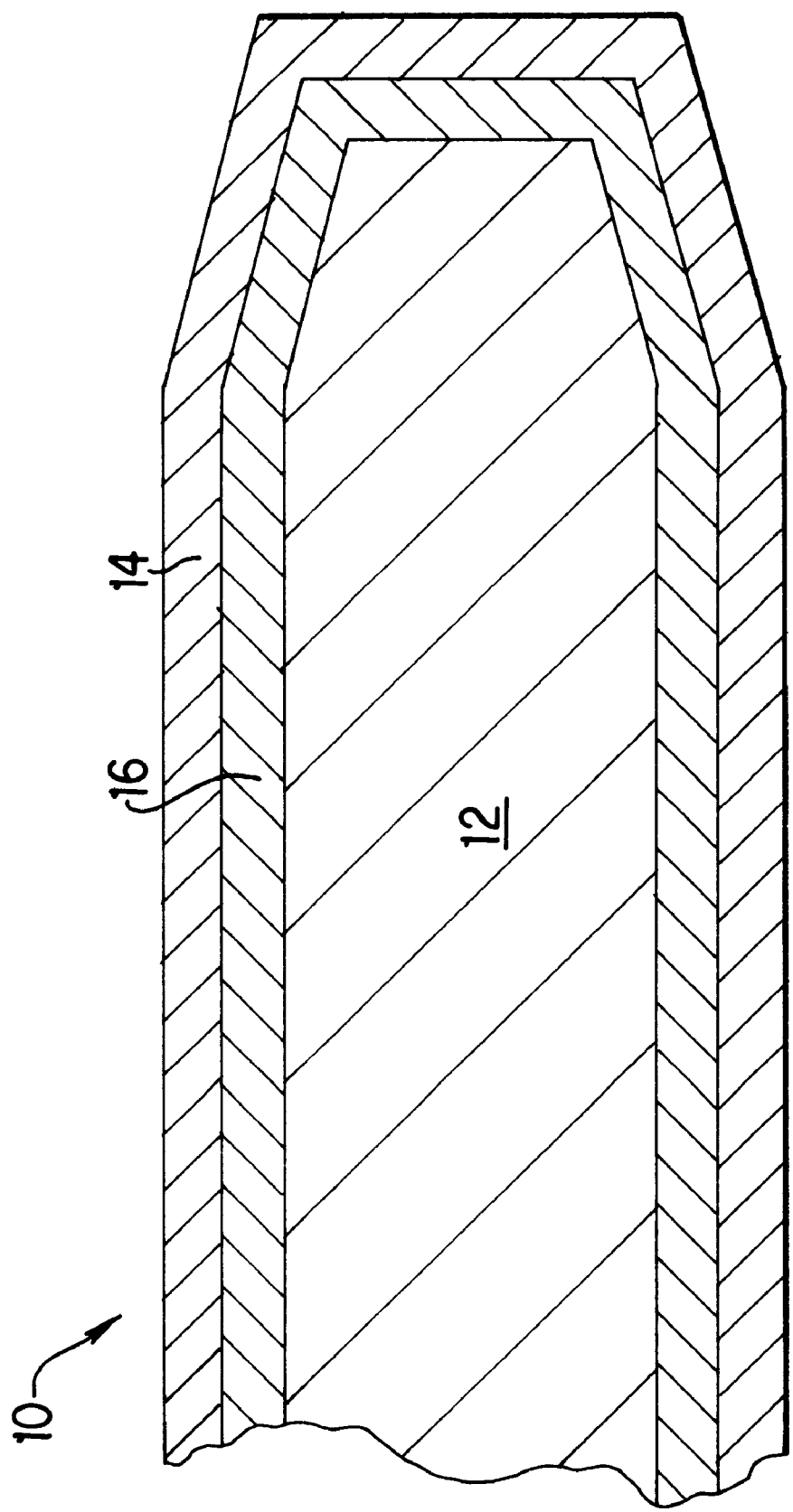

FIG. 1 illustrates a composite material 10 useful as an electrical connector component. Such components include sockets and plugs. The composite material 10 is particularly useful as a component for an electrical connector exposed to elevated temperatures, in excess of 75° C., on either an intermittent basis or a continuous basis, such as under the hood of an automobile.

The composite material 10 has a copper or copper base alloy substrate 12 and a tin or tin base alloy coating layer 14 overlying at least a portion of the substrate 12. "Base" is used in its conventional sense in the metallurgical arts, meaning the alloy contains at least 50%, by weight, of the base component.

Interposed between the substrate 12 and the coating layer 14 is a barrier layer 16. The barrier layer 16 contains from 10% to 70%, by weight, of nickel and further has a thickness of from 0.2 micron to 10% of the total thickness of the composite material 10.

Preferably, the nickel content of the barrier layer 16 is from 20% to 40%, by weight, and more preferably, the nickel content is from 25% to 35%, by weight. A preferred thickness range for the barrier layer 16 is from 0.2 micron to 5 microns and a most preferred thickness range is from 0.2 micron to 1.5 microns.

The substrate 12 is formed from copper or a copper base alloy. Preferably, the copper alloy substrate has an electrical conductivity above about 25% IACS (IACS refers to conductivity as defined by the International Annealed Copper Standard and rates "pure" copper as having an IACS of 100% at 20° C.). Most preferably, the electrical conductivity of the substrate 12 is above about 35% IACS.

The substrate 12 has a room temperature yield strength above about 50 ksi and, preferably, above about 65 ksi.

Suitable alloys include those designated by the Copper Development Association as copper alloy C7025 having the composition, by weight, of 2%–4.8% nickel, 0.2%–1.4% silicon, 0.05%–0.045% magnesium and the balance copper; copper alloy C194 having the composition, by weight, of 2.1%–2.6% iron, 0.05%–0.20% zinc, 0.015%–0.15% phosphorous and the balance copper; and copper alloy C197 having the composition, by weight, of 0.3%–1.2% iron, 0.1%–0.4% phosphorous, 0.01%–0.2% magnesium and the balance copper.

The tin base coating 14 is applied by any conventional method such as electroplating, hot dipping, electroless chemical deposition, vapor deposition or cladding. When electroplated, the coating layer is either matte or bright. The electroplated layer may be reflowed to improve cosmetics and to reduce defects in the plating, thereby improving the performance of the coating in solderability and the contact properties in connector applications.

The tin base coating layer may be a tin alloy, such as a tin/lead solder. Tin compounds, as more fully disclosed in U.S. Pat. No. 5,028,492 to Guenin that is incorporated by reference in its entirety herein, may also be utilized. Compounds that may be added as particulate to a tin base matrix include silicon carbide, aluminum oxide, silica ($SiO_2$), carbon black, graphite, tungsten carbide, molybdenum disulfide and polytetrafluoroethylene ("TEFLON", a trademark of DuPont Corporation of Wilmington, Del.).

The thickness of the tin base coating layer 14 is from 0.5 microns to 10 microns and preferably from 0.75 micron to 1.5 microns. The preferred coating is electroplated matte tin that is subsequently reflowed by heating to a temperature above the melting point of tin. Heating is by any suitable method, such as in a hydrocarbon type reducing atmosphere; in some other suitable atmosphere such as air, nitrogen or other inert gas; an induction furnace; infrared heating; or immersion in hot oil.

The barrier layer 16 has a minimum thickness of about 0.2 micron. Below this thickness, copper from the substrate 12 diffuses through defects in the barrier layer 16 leading to an increase in the rate of intermetallic formation.

The maximum thickness of the barrier layer 16 is approximately 10% of the total thickness of the composite material 10 and preferably, less than about 5% of the total thickness of the composite material 10. The minimum barrier thickness depends on the method of depositing the tin base layer 14. Tin base coatings applied by electroplating require low barrier thickness layers, closer to the specified minimum thicknesses. Dip coatings require relatively thicker coatings, closer to the specified maximums, to compensate for the erosion of the barrier layer when immersed in molten tin for the dip coatings.

For connector applications, the substrate 12 has a minimum thickness that is effective to withstand the forces associated with insertion and removal. Typically, this minimum thickness is on the order of at least 50 microns and more preferably, from 200 microns to 500 microns.

The maximum barrier layer thickness is on the order of 5 microns. Above this thickness, the barrier layer begins to influence both the electrical conductivity and the yield strength of the composite material 10. Since the copper/nickel alloy has a relatively low electrical conductivity, the influence of the barrier layer is preferably minimized.

A preferred barrier layer 16 thickness is from 0.2 micron to 5 microns. A more preferred thickness range for the barrier layer is from 0.2 micron to 1.5 microns.

The barrier layer contains from 20% to 40%, by weight, of nickel. When the nickel content is less than 20%, the barrier layer 16 is not effective for reducing the rate of intermetallic formation. When the nickel content exceeds 40%, the electrical conductivity of the barrier layer is reduced and, as illustrated in FIG. 2, the rate of intermetallic formation increases.

Figure 2:
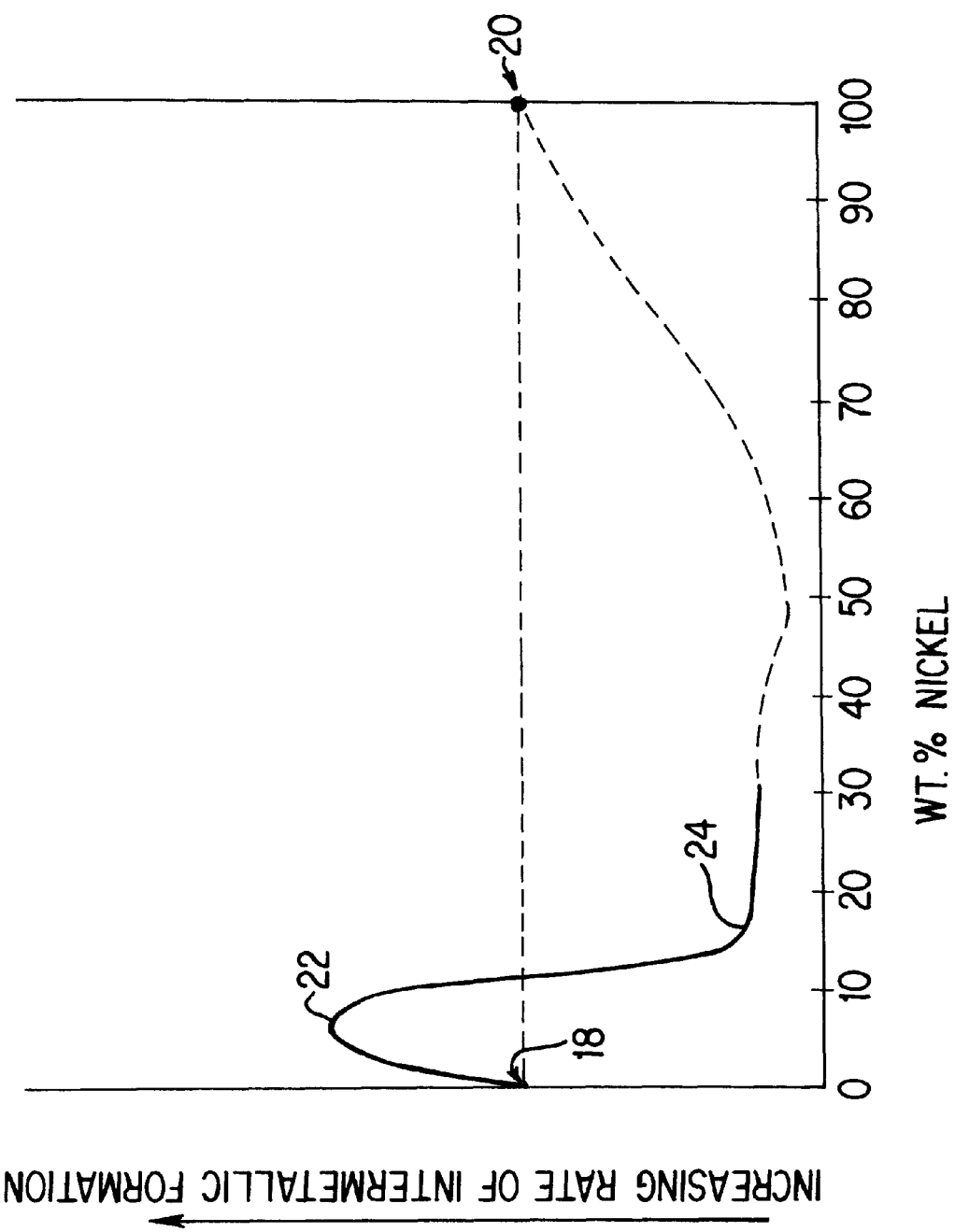

FIG. 2 graphically illustrates the relationship between the rate of intermetallic formation and the nickel content of a binary nickel-copper barrier layer. There is surprisingly little difference in the rate when the barrier layer is 100% copper, reference point 18, as compared to 100% nickel, reference point 20. Applicants measured the rate of intermetallic formation as a function of the nickel content from 0% nickel (100% copper) up to 60%, by weight, nickel and at 100% nickel.

The rate of intermetallic formation was measured by X-ray fluorescence. The total tin thickness was first measured ($M_1$). The unreacted tin then removed by chemical stripping. The amount of tin remaining was next measured ($M_2$) and the difference between $M_1$ and $M_2$ was the amount of free tin remaining.

The rate of intermetallic formation is at a maximum when the barrier layer has a composition of approximately 8%, by weight, nickel and the balance copper, reference point 22. From 12%, by weight, of nickel to higher amounts, the rate of intermetallic formation is less than the rate for a pure nickel or pure copper barrier layer. From 20% to 40%, by weight, the rate of intermetallic formation is at a minimum 24.

Applicants deduced from FIG. 2 that at a nickel content in excess of 40%, by weight, the rate of intermetallic formation increases and the electrical conductivity decreases. Therefore, in a barrier layer 16 consisting essentially of nickel and copper, the nickel content of that barrier layer is preferably between 20% and 40%, by weight.

The barrier layer 16 is, in one embodiment, a binary alloy containing nickel with the remainder of the alloy, preferably being selected from the group consisting of tin, iron, cobalt and copper. It is most preferred to combine copper with the nickel because this combination has the lowest intermetallic growth rate.

Alternatively, the barrier layer 16 may be a ternary, or higher, alloy, that contains, in addition to nickel: tin, copper, iron, zinc, cobalt, indium, mixtures thereof and, optionally, one or more elements selected from the group consisting of tungsten, chromium, vanadium, manganese and phosphorous.

Alloys containing from 15% to 40% by weight cobalt with the alloying additions specified above for nickel are also believed to be satisfactory. The preferred amounts of cobalt are the same as those specified above for nickel.

The barrier layer is applied to either the entire or to a part of the substrate 12 by any suitable means, including hot dipping, cladding or electroplating. For ease of deposition and control of barrier layer thickness, electroplating is preferred. A copper- 20% to 40%, by weight, of nickel, barrier layer may be deposited from an aqueous citrate electrolyte. The electrolyte is an aqueous solution containing 30–80 grams per liter of nickel, 7–35 grams per liter of copper, and 80–320 grams per liter of sodium citrate dihydrate. The solution is heated to a temperature between 40° C. and 70° C. for use. The substrate is immersed in the electrolyte as the cathode with stainless steel suitable as an anode. A current density of 30–120 milliamps per square centimeter is impressed through the electrolyte. After between about 0.5 minute and 2 minutes, a barrier layer having a nominal thickness of between 0.3 micron and 2.5 microns is deposited.

The barrier layer should be relatively smooth, as opposed to nodular, since a nodular coating increases the surface area of the interface between the substrate and the tin leading to an increase in the rate of intermetallic formation. Cosmetically, a smooth barrier layer increases the brightness of a reflowed tin coating layer.

The effectiveness of the copper/nickel barrier layer 16 is enhanced by the addition of one or more refining compounds to the electrolyte. These refining compounds include benzotriazole (BTA), glues, proteins, thiourea, sulfon compounds and chloride ion donators such as nickel chloride. The refining compound are effective to reduce the porosity and the roughness of the deposited barrier layer and can also provide the barrier layer with a more fine crystalline grain structure.

Reducing the porosity of the barrier layer reduces the rate of tin and copper diffusion. Reducing the roughness of the barrier layer reduces the interfacial area between the barrier layer and the substrate and between the barrier layer and the coating, leading to a reduced rate of copper and tin diffusion. Modifying the crystalline grain structure to increase the fineness of the grains may lead to a more compact intermetallic structure, effectively reducing the rate of intermetallic growth.

Preferably, from about 10 ppm to about 1000 ppm of the refining compound is added to the electrolyte to achieve the desired reduction in porosity and roughness and lead to a more fine grain structure. In a preferred embodiment, the refining compound is from 50 ppm to 100 ppm of BTA.

Alternatively, the barrier layer 16 is mechanically deformed, such as by rolling, or thermally treated, such as by heating to modify the grain structure of the barrier layer prior to deposition of the tin base coating.

In one exemplary process, after the copper/nickel barrier layer is deposited on the substrate, the barrier layer/substrate composite is annealed at a temperature of from 300° C. to 500° C. for from 30 minutes to 120 minutes. To minimize oxidation of the composite, annealing is in an inert or reducing atmosphere such as cracked ammonia (by volume, 96% nitrogen and 4% hydrogen). The annealed composite is then passed through a rolling mill at room temperature (about 20° C.) and subjected to a thickness reduction of between 10% and 20%.

In addition to providing a more compact crystalline grain structure or a preferred crystalline orientation, the annealing and rolling, either separately or in combination, increase the hardness of certain copper alloys through work hardening and precipitation aging. This hardening is particularly useful when forming an electrical connector. One exemplary alloy for the substrate for this process is copper alloy C194.

Additionally, thermal processing, by annealing, improves bend formability of the composite material. The annealing is believed to relieve stresses that might exist in the electrodeposited copper/nickel barrier layer.

The tin base coating layer 14 is then applied by conventional means over at least a portion of the barrier layer 16.

Figure 3:
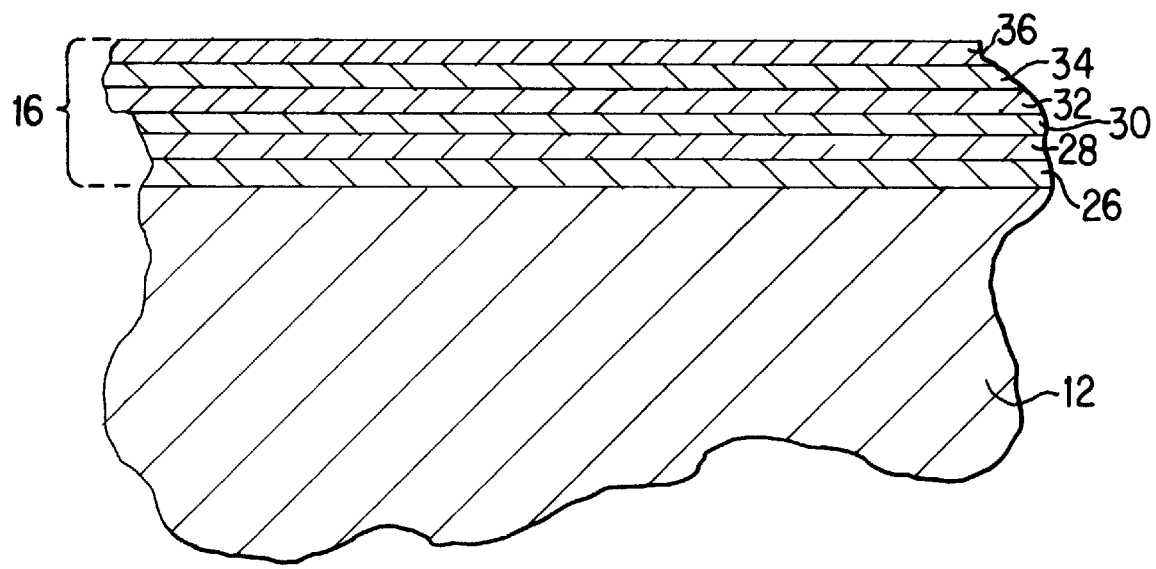
FIG. 3 illustrates in cross-sectional representation a multiple layer deposition process for forming a barrier layer.

When the barrier layer is a codeposited alloy of two or more metals, it is frequently difficult to accurately control the alloy composition. FIG. 3 illustrates a method for achieving more accurate control over the composition of the barrier layer 16.

The alloy constituents are deposited sequentially. A first layer 26, that is one alloy constituent, such as nickel, is deposited to a desired thickness. A second alloy constituent is then deposited as a second layer 28. This second layer 28 may, for example, be copper. The thickness of the first layer 26 and second layer 28 is that effective to provide a desired amount of first and second constituent. The layers may be used as a barrier layer, either as deposited or after diffusion.

The layers 26, 28 are deposited by any suitable process such as electrolytically, by electroless deposition, chemical vapor deposition or plasma deposition. Multiple layers of the same material may be deposited. For example, first layer 26, third layer 30 and fifth layer 34 may be a first constituent while second layer 28, fourth layer 32 and sixth layer 36, a second constituent. Multiple thin layers provide for a more homogenous barrier layer 16 subsequent to diffusion.

When the first constituent is nickel and the second constituent is copper, diffusion to a homogeneous nickel level of about 20%–40%, by weight, may be achieved by heating to a temperature of from 750° C. to 850° C. for from 12 minutes to 72 minutes.

Third layer 30 may constitute a third constituent. For example, when the first constituent is nickel and the second constituent copper, the third constituent may be tin. The fourth layer 32 may then constitute a fourth constituent such as silver, silicon, aluminum, zinc, iron, chromium, manganese, cobalt, vanadium, indium or phosphorous.

Any combination of elements may be so combined. To limit formation of the intermetallic, the barrier layer contains, after diffusion, from 20% to 40% of nickel.

The innermost first layer 26 may be a flash with a thickness of less than 50 microinches, and preferably with a thickness of between 2 microinches and 20 microinches. The flash may be any metal, but is preferably copper or nickel. The flash has the effect of leveling the surface to mask any surface irregularities in the substrate, reducing the interfacial area available for diffusion.

The flash also minimizes the effect the alloying constituents in the substrate have on the deposition of the barrier layer.

The layers need not be elemental. One or more of the layers may constitute a binary or higher alloy. For example, the first layer may be Ni+X and the second layer Cu+Y. When heated, X and Y may combine either with each other or with the copper and the nickel to form useful intermetallics in the barrier layer. For example, X could be Si to form a nickel silicide.

Any number of layers may be repeated any multiple number of times. It is not necessary that the same sequence of layers be repeated over and over, merely that when all layers are deposited, the combined thicknesses of all layers provides the desired barrier layer composition. The multiple layers are then diffused to provide the desired degree of homogeneity to the barrier layer 16.

The thickness of the tin coating layer decreases rapidly when first heated. At the same time, there is a rapid formation of the copper-tin intermetallic in the barrier layer. Once the barrier layer is saturated with the copper/tin intermetallic, the rate of tin thickness decrease rapidly declines.

In accordance with another embodiment of the invention, the barrier layer 16 is formed to contain a high initial concentration of an intermetallic, as one or more of (Cu—Ni)$_3$Sn, (Cu—Ni)$_6$Sn$_5$, Cu$_3$Sn and Cu$_6$Sn$_5$. It is believed that this barrier layer saturated with the intermetallic will significantly reduce the development of additional intermetallic through the sacrificing of a portion of the tin layer.

Figure 4:
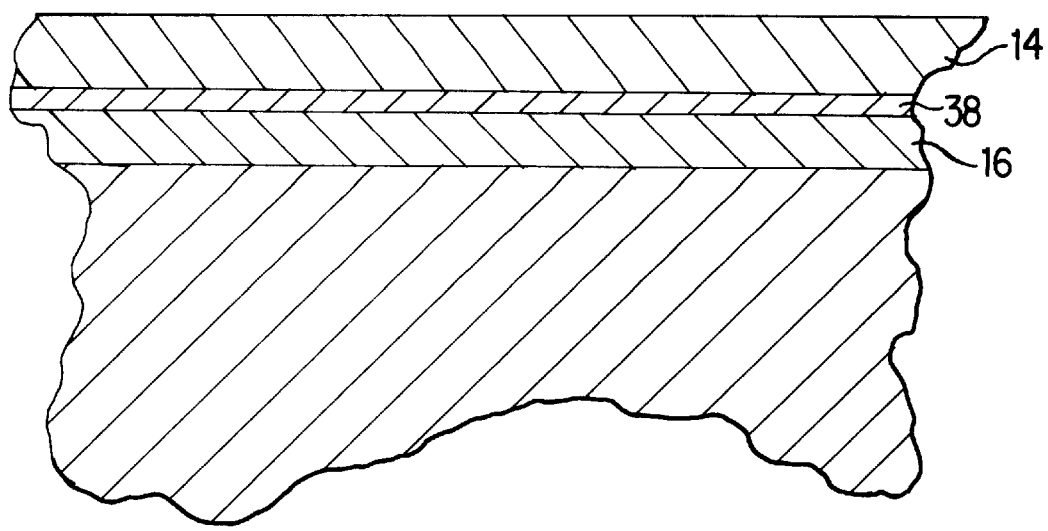
FIG. 4 illustrates in cross-sectional representation an intermetallic layer in combination with a barrier layer.

In a preferred embodiment, as illustrated in FIG. 4, the intermetallic layer 38 is disposed between the barrier layer 16 and the tin layer 14. The intermetallic layer 38 is believed effective to inhibit the degradation of the tin layer 14 above any suitable barrier layer 16. Preferably, the barrier layer 16 is a copper/nickel alloy having from about 20% to about 40%, by weight, of nickel. The barrier layer 16 has a thickness of from about 10 to about 50 microinches. The intermetallic layer 38, that is deposited by any suitable process such as vapor deposition or electrolytic plating, either as a codeposition or as separate layers that are subsequently diffused together as described above. The intermetallic layer 38 has a thickness of from about 100 angstroms to about 10,000 angstroms and preferably from about 200 angstroms to about 1000 angstroms.

The advantages of the barrier layer of the invention will become more apparent from the examples that follow.

EXAMPLES

EXAMPLE 1

Copper alloy C194 coupons coated with 30 microinches (0.75 microns) of a specified barrier layer, selected from the group:

Cu—20% Ni

Fe

Ni

Cu and control coupons of copper alloy C194 and C710 (nominal composition by weight, 80% copper 20% nickel with a nominal electrical conductivity of 6.5% IACS) without a barrier layer were coated with 40 microinches (1 micron) of matte tin by electrodeposition.

The coupons were then heated to temperatures between 125° C. and 175° C. for up to 250 hours. The contact resistance was determined by utilizing a gold probe and a method similar to ASTM methods B539-80 and B667-80. The contact resistance, in milliohms, as a function of the aging temperature and the aging time is presented in Table 1 and in FIG. 3.

TABLE 1

| Barrier Layer/ Substrate Aging temp × time | None/ C194 | None/ C710 | Cu/ C194 | Ni/ C194 | Cu—Ni/ C194 | Fe/ C194 |
|---|---|---|---|---|---|---|
| | CONTACT RESISTANCE MILLIOHMS | | | | | |
| Initial | 1.93 | 3.33 | 1.08 | 1.76 | .908 | 1.55 |
| 125° C. × 100 hrs | 1.76 | 2.72 | 1.56 | 2.00 | .919 | 1.76 |
| 125° C. × 250 hrs | 2.32 | 4.76 | 5.04 | 15.4 | .913 | 4.92 |
| 150° C. × 100 hrs | 8.06 | 3.53 | 8.96 | 15.4 | 7.00 | 13.8 |
| 150° C. × 250 hrs | 26.2 | 4.80 | 49.6 | 41.6 | 6.27 | 13.7 |
| 150° C. × 500 hrs | 61.6 | 5.76 | 434 | 140 | 16.5 | 37.9 |
| 175° C. × 100 hrs | 61.0 | 4.57 | 94.2 | 942 | 600 × 10$^3$ | 118 |
| 175° C. × 250 hrs | 3570 | 12.3 | 3060 | 79.8 | 49.6 | 13.3 |

As illustrated in FIG. 3, a low contact resistance was achieved with a copper/nickel barrier layer under most test conditions. The high contact resistance for the copper/nickel barrier layer after aging at 175° C. for 100 hours is believed to be a test anomaly.

The amount of free tin remaining, that portion of the tin not converted to the copper/tin intermetallic, was determined by X-ray fluorescence and recorded in microinches. As summarized in Table 2 and illustrated in FIG. 4, a large volume of free tin remaining was achieved under most test conditions with the copper-nickel barrier layer.

TABLE 2

| Barrier Layer/ Substrate Aging temp × time | None/ C194 | None/ C710 | Cu/ C194 | Ni/ C194 | Cu—Ni/ C194 | Fe/ C194 |
|---|---|---|---|---|---|---|
| | FREE TIN THICKNESS MICROINCHES | | | | | |
| Initial | 30.54 | 28.49 | 27.3 | 25.2 | 12.1 | 33.9 |
| 125° C. × 100 hrs | 8.58 | 30.71 | 7.85 | 12.3 | 14.3 | 8.90 |
| 125° C. × 250 hrs | 1.26 | 20.57 | 1.4 | 8.56 | 11.1 | 3.24 |
| 150° C. × 100 hrs | 1.85 | 23.71 | 0.49 | 0.22 | 2.82 | 1.04 |
| 150° C. × 250 hrs | 0.72 | 18.93 | -0- | -0- | 3.48 | 0.77 |
| 150° C. × 500 hrs | -0- | 14.06 | -0- | 5.56 | 0.77 | 3.18 |
| 175° C. × 100 hrs | 0.17 | 13.23 | -0- | -0- | 0.38 | 0.11 |
| 175° C. × 250 hrs | -0- | 7.45 | -0- | 0.26 | 0.18 | -0- |

A copper alloy C710 control coupon having no barrier layer had a low contact resistance and a large volume of free tin. However, the C710 substrate has too low an electrical conductivity, less than 10% IACS, for use as an electrical connector in automotive under the hood applications.

EXAMPLE 2

Copper alloy C194 coupons were coated with 40 microinches of a copper-(30% by weight) nickel alloy barrier layer and were then coated with 50 microinches of matte tin that was subsequently reflowed. Both the barrier layer and the matte tin were electrolytically deposited. The copper and nickel of the barrier layer were co-deposited.

The control was copper alloy C194 coupons electrolytically coated with matte tin that was subsequently reflowed. The control lacked the barrier layer.

The test coupons and the control were then aged at 125° C. for up to 2000 hours. The thickness of the intermetallic layer (IMC) in microinches was then measured and recorded as a function of the square root of the number of hours aged. The test coupons results are illustrated by reference line 40 in FIG. 7 and the control results by reference line 42. The intermetallic thicknesses for age times in excess of 2000 hours are extrapolated from the graph.

EXAMPLE 3

FIG. 8 is a micrograph at a magnification of 2000X illustrating the copper/tin intermetallic that develops in the copper alloy C194 substrate/copper–30% nickel/tin plate system when the substrate/barrier layer is not subjected to thermal or mechanical processing. The intermetallic was exposed by selective chemical removal of residual tin. The intermetallic is comprised of rapidly growing spheroids.

FIG. 9 is a micrograph at a magnification of 2000X illustrating the copper/tin intermetallic that develops in the copper alloy C715 substrate (nominal composition by weight 30% nickel, balance copper)/tin plate system when the substrate was mechanically deformed by rolling prior to deposition of the tin. The intermetallic was exposed by selective chemical removal of residual tin. The intermetallic is comprised of relatively slow growing flattened obelisks. Preferably, the flattened obelisks have an aspect ratio (length to width) of at least 5:1.

We have determined that the spheroids grow at about twice the rate of the flattened dendrites.

It is apparent that there has been provided in accordance with the present invention a barrier layer that is interposed between a copper base substrate and a tin base coating layer that fully satisfies the objects, means and advantages set forth hereinabove. While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A composite material, comprising:
   a copper or a copper base alloy substrate;
   a coating layer consisting of tin or a tin base alloy overlying a portion of said substrate;
   an electroplated barrier layer interposed between said substrate and said coating layer directly contacting said coating layer, said barrier layer containing from 20% to 40%, by weight, of nickel and having a thickness of between 0.2 and 5 microns and
   a metallic flash disposed between said substrate and said barrier layer and in direct contact with both said substrate and said barrier layer, said metallic flash having a thickness of from 2 microinches to 50 microinches.

2. The composite material of claim 1 wherein said barrier layer further contains at least one element selected from the group consisting of copper, tin, cobalt, iron and mixtures thereof.

3. The composite material of claim 2 wherein said barrier layer is predominantly copper.

4. The composite material of claim 2 wherein said metallic flash is selected from the group consisting of copper and nickel.

5. The composite material of claim 4 wherein the thickness of said metallic flash is up to 20 microinches.

6. The composite material of claim 5 wherein said coating layer includes particulate selected from the group consisting of silicon carbide, aluminum oxide, tungsten carbide, molybdenum disulfide, silica, carbon black, graphite and polytetrafluoroethylene.

7. A composite material, comprising:
   a copper or a copper base alloy substrate;
   a coating layer consisting of tin or a tin base alloy overlying a portion of said substrate;
   an electroplated barrier layer interposed between said substrate and said coating layer directly contacting said coating layer said barrier layer containing from 20% to 40%, by weight, of nickel and having a thickness of between 0.2 and 5 microns; and
   a copper-tin intermetallic dispersed in said coating layer, said intermetallic having a flattened obelisk shape.

8. The composite material of claim 7 wherein said intermetallic has a length to width aspect ratio of greater than 5:1.

* * * * *